United States Patent [19]
Bishkin

[11] 4,453,959
[45] Jun. 12, 1984

[54] CRYSTAL WASHING AND PURIFICATION METHOD

[76] Inventor: D. Bruce Bishkin, 324 S. 42nd St., #1, Philadelphia, Pa. 19104

[21] Appl. No.: 352,193

[22] Filed: Feb. 25, 1982

[51] Int. Cl.³ .............................................. B01D 9/02
[52] U.S. Cl. ........................................ 62/542; 62/535
[58] Field of Search ................... 422/251; 62/535, 542, 62/544, 545, 532; 23/295 R

[56] References Cited

U.S. PATENT DOCUMENTS

| | | | |
|---|---|---|---|
| 1,738,275 | 12/1929 | Baker | 426/491 |
| 1,813,575 | 12/1931 | Janecke et al. | 423/205 |
| 2,598,449 | 5/1952 | Scott | 260/674 |
| 2,659,761 | 11/1953 | Frevel et al. | 260/652 |
| 3,132,096 | 5/1964 | Walton | 210/59 |
| 3,155,459 | 11/1964 | Brown et al. | 23/310 |
| 3,595,625 | 7/1971 | Bruce | 23/273 |
| 3,630,685 | 12/1971 | Schildknecht | 23/273 |
| 3,652,230 | 3/1972 | Girling | 23/273 |
| 3,660,043 | 5/1972 | Schildknecht et al. | 23/273 |
| 3,770,386 | 11/1973 | Hayashi et al. | 23/270 |
| 3,796,060 | 3/1974 | Moyers, Jr. | 62/58 |

FOREIGN PATENT DOCUMENTS 2064976   6/1981   United Kingdom ................ 422/251

*Primary Examiner*—Hiram H. Bernstein
*Attorney, Agent, or Firm*—Pravel, Gambrell, Hewitt, Kirk & Kimball

[57] ABSTRACT

A method for separating and purifying a crystallized component from a two-phase slurry of a crystallized component in a liquified multi-component mixture, the method including a purification column capable of withdrawing the crystallized component from the slurry having multi-component mixture therewith, and passing a heated inert gas through the purification column in a direction countercurrent to the withdrawal of the crystallized component to result in a purified residue of crystallized component.

7 Claims, 1 Drawing Figure

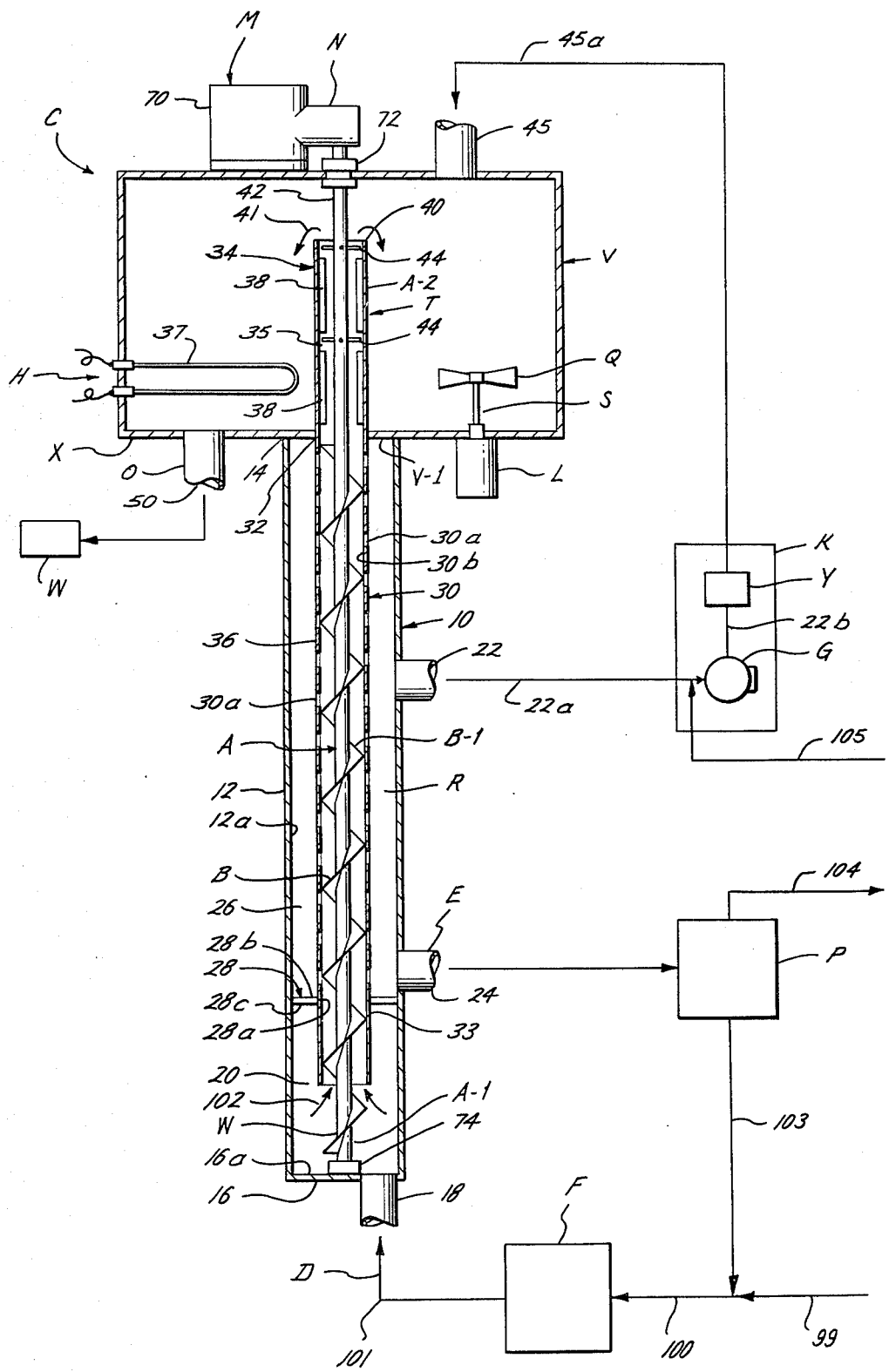

CRYSTAL WASHING AND PURIFICATION METHOD

FIELD OF THE INVENTION

The present invention relates to a method for washing and purifying a crystallized component from a multi-component mixture.

PRIOR ART

The concept of selective crystallization to purify eutectic as well as solid solution mixtures is well known in the prior art. Typical of such prior art crystallization devices and methods are those in U.S. Pat. Nos. 1,738,275; 2,598,449; 2,659,761; 3,132,096; 3,595,625; 3,630,685; 3,652,230; 3,660,043; 3,770,386; and 3,796,060. So far as is known, in order to effect purification, it has been necessary to establish a temperature gradient in the prior art devices through a combination of conductive heating and cooling elements, insulation and a differential temperatures between the opposing flows of liquid mixture and crystallized material.

So far as is known, to increase the capacity of the prior art selective recrystallization devices and methods it was necessary to overcome the tendency of the crystals to agglomerate as the production rates increased. Various combinations of mechanical agitation have been utilized as in U.S. Pat. Nos. 3,796,060, 3,630,685 and 3,770,386 to prevent coagulation of the crystals and to ensure a more complete reflux of the liquified multi-component to maintain the desired levels of purity in the crystallized component.

Though the benefits of using crystallization as a purification process are widely known, very little commercialization has been made of this process. A most important benefit of using crystallization rather than distillation-presently the most common form of separation and purification—is that crystallization can theoretically achieve the same separation and purification with as little as two percent of the energy required to do the same separation by distillation. This is so because the heat of vaporization is usually substantially larger than the heat of crystallization and the partitioning coefficient although highly variable from mixture to mixture, is usually much higher in solid-liquid systems than in liquid-gas systems. As a result, the number of phase transitions to effect the same separation in crystallization is much smaller than the number required in distillation.

Finally, achieving a high purity in distillation is often hampered by a physical phenomenon called azeotroping which effectively prevents ultra high purity from being obtained. However, the so-called eutectic phase equilibria of many organic solid-liquid systems enables ultra high purity to be obtained through crystallization.

Several problems have inhibited the commercialization of selective crystallization. First, among these is the very small sized crystals which form from multi-component liquid mixtures cooled at commercially practical rates. The ratio of the surface area to weight of such crystals is such that when the crystal is removed from the multi-component liquid, an amount of liquid equal to the amount of crystal removed will adhere to the surface of the crystal due to surface tension alone. So far as known, no existing crystallization process has been developed to to overcome this problem.

SUMMARY OF THE INVENTION

The present invention relates to a new and improved method for the washing and purification of a crystallized component of a liquified multi-component mixture, whereby a heated, countercurrent flow of inert gas is directed against crystallized component withdrawn from the mixture in a purification column to melt and wash away substantially all retained liquified multi-component mixture on the crystallized component whereby a high degree of purity may be achieved.

BRIEF DESCRIPTION OF THE DRAWING

The FIGURE is an elevational, partly schematic, view of the apparatus for crystal washing and purification of the present invention.

DESCRIPTION OF THE PREFERRED EMBODIMENT

The crystal washing apparatus of the present invention is generally referred to in the drawing by the letter C. The crystal washing apparatus C includes generally a purification column 10, directing means D for directing a two-phase slurry of crystallized component and liquified multi-component mixture into the purification column 10, withdrawing means W in the column 10 for withdrawing the crystallized component out of the two-phase slurry and countercurrent injecting means 45 for injecting a heated, inert gas into the purification column 10 to melt and wash away substantially all remaining liquified multi-component mixture about the crystalline structure of the crystallized component. The crystal washing apparatus C also includes generally refluxing means R for refluxing the liquified multi-component mixture within the purification column 10 and extracting means E for extracting the refluxed liquified multi-component mixture from the purification column 10. Further, the crystal washing apparatus C includes removing means X within the crystal washing apparatus C for removing a purified crystallized residue. Such removing means X further includes heating means H for heating the purified residue until it melts, stirring means S for stirring the melted purified residue and flow means O for outwardly flowing the melted residue from the crystal washing apparatus C.

In the present invention, such a multi-component mixture includes eutectic solutions as well as solid solutions. The crystallized component will have the lowest melting point of the various constituents in the multi-component liquid and ordinarily will be the material desired to be purified. However, it will be understood and appreciated by those skilled in the art that the crystallized component could also be the impurity which is desired to be removed from the multi-component liquid whereby the remaining liquid will have been purified.

The purification column 10 of the crystal washing apparatus C includes an outer shell 12 preferably of a cylindrical configuration integrally connected at its upper end 14 to a collection vessel V and capped at its lower end 16. An inlet conduit 18 is mounted at its lower end 16 for communicating the two-phase slurry from a refrigeration unit F to a receiving chamber 20 formed within the purification column 10. The refrigeration unit F may be of any suitable type capable of chilling the slurry to a proper temperature. A cooled gas outlet conduit 22 and a liquor outlet conduit 24 permit the withdrawal of cooled gas and liquor, respectively, from the purification column 10. A septum plate 28 is integrally mounted with the interior surface 12a of the outer cylindrical shell 12 dividing the purification column 10 into a lower receiving chamber 20 and an upper refluxing chamber 26. The septum plate 28 is formed preferably having a central passageway 28a for receiving a vertically disposed, inner shell 30, preferably of a cylindrical configuration, which may pass through the passageway 28a and be integrally mounted thereto.

The refluxing chamber 26 is formed within the purification column 10 and is bounded by the interior surface 12a of the outer cylindrical shell 12, an outer surface 30a of the inner cylindrical shell 30, an upper surface 28b of the septum plate 28 and a lower surface V-1 of collection vessel V. The receiving chamber 20 is formed within the purification column 10 and is defined by the interior surface 12a of the outer cylindrical shell 12, the outer surface 30a of the inner cylindrical shell 30, a lower surface 28c of the septum plate 28 and an interior surface 16a of lower end 16.

The gas and liquor outlet conduits 22, 24 are affixed to the outer cylindrical shell 12 such that the gas outlet conduit 22 is mounted a predetermined distance above the liquor outlet conduit 24 and both conduits 22, 24 are in flow communication with the refluxing chamber 26. The inner cylindrical shell 30 is mounted within and preferably in longitudinal alignment to the outer cylindrical shell 12. The inner cylindrical shell 30 permits communication of the collection vessel V with the receiving chamber 20. The inner cylindrical shell 30 is preferably secured to the collection vessel V at integral attachment 32 and integrally attached to septum plate 28 adjacent its lower end 33. The inner cylindrical shell 30 also includes an upper portion or washing tube section generally designated as 34 formed from stainless steel sheet or other like material. The washing tube section 34 extends a predetermined distance into the collection vessel V and a lower portion or refluxing tube section 36, preferably formed from a foraminiferous material such as 50–100 micron stainless steel screen, extends into chamber 26. The washing tube section 34 has baffles 38 mounted longitudinally along the inner surface 35 of the washing tube section 34 adjacent the upper end 40 thereof. The baffles 38 preferably are substantially elongated rectangular members disposed about the inner surface 35 in such a fashion to form passgeways (not shown) between adjoining baffles 38 to permit vertical flow between adjacent baffles. The diameter of the inner cylindrical shell 30 is preferably, by way of example, approximately two to three inches in diameter to insure adequate washing of the crystals as discussed more fully below. However, this is not a severe limitation since a multiplicity of purification columns 10 can be placed within the same purification tower apparatus, if such is desired.

An auger A of the crystal washing apparatus C of the present invention include a preferably, helically shaped blade B mounted for rotation within the cylindrical shell 30. Preferably, the auger A is in longitudinal alignment with and in close proximity to the inner surface 30a of inner cylindrical shell 30. The auger A includes a shaft 42 that is adopted to be rotated by rotating means M, which by way of example may include rotation speeds of 50 to 300 rpm. The shaft 42 is mounted for such rotation with the crystal washing apparatus A of the present invention by means of bearings 72, 74 mounted with the vessel V and lower end 16 of the outer shell 12, respectively. The rotating means M may include the use of an electric motor 70 and V-belt (not shown) enclosed within rotating means housing N.

The blade B of the auger A is formed from a continuous stripe metal B-1 attached along the length of auger A originating at the lower end A-1 of the auger A and continuing upwardly through and within the inner shell 30 into the refluxing chamber 26 to a point adjacent attachment 32, in a helical fashion. The blade B is continuously in close proximity to an inner surface 30b of the inner cylindrical shell 30 to ensure that the crystallized component does not agglomerate thereto. Paddles 44 are mounted with the upper end A-2 of the auger A and extend radially outwardly a predetermined distance from shaft 42 into close proximity with inner surface 35. The combined action of the baffles 38 and paddles 44 ensures that an injected countercurrent flow of heated inert gas causes the crystallized component advancing into the washing tube section 34 to form a porous residue of crystallized component, as discussed below.

The crystal washing apparatus C further includes a collection vessel V attached to the purification column 10. The collection vessel V includes the counter current injecting mean 45 mounted with the collection vessel V for injecting heated, inert gas into the collection vessel V. The counter current injecting means 45 receives heated, inert gas from recycling means K. Recycling means K recycles the inert gas by reheating and recompressing the inert gas. Heating means H is mounted within the collection vessel V to heat and melt the collected purified crystal residue in the collection vessel V. The heating means H, as is well known, preferably includes an electric resistance-type heating coil 37. Any other type of suitable heating means H may be alternatively be used.

The stirring means S is mounted within the collection vessel V for circulating crystals collected within the collection vessel V. This circulation ensures movement of the collected purified crystal residue in the collection vessel V into close proximity with the heating means H to enhance melting thereof. The stirring means S includes preferably suitable motor means L capable of powering a stirring blade Q which rotates within the vessel V. A purified residue outlet conduit 50 is mounted adjacent the lower surface V-1 of collection vessel V whereby the melted purified crystal residue may be removed from the collection vessel V for storage or use as is desired.

The crystal washing apparatus C of the present invention further includes a purging unit P for receiving liquors from liquor outlet conduit 24 and purging a portion of the impurities from the liquor. The purging unit P directs a predetermined portion of liquor and impurities into flowline 104 with the balance of liquor and impurities being directed into flowline 103. The liquor and impurities in flowline 103 are blended with fresh multi-component liquid from flowline 99 and the combination is thereafter directed into flowline 100 whereby the concentration level of impurities in the crystal washing appartus C is controlled.

It should be noted that even though flowline 104 contains impurities, it has substantially the same composition as in flowline 103. The ratio of flowline 104 to flowline 103 determines the level of impurities which build up (at steady state) in flowline 101. Thus, the purging unit P provides a way for impurities entering flowline 99 to be taken out of the system. The liquor and impurities in flowline 104 may be directed into another crystal washing apparatus (not shown) where more of the desired crystallized component may be removed and purified, if desired.

In the use or operation of the crystal washing apparatus C of the drawing, a multi-component liquid mixture of essentially 95% pure component, hereafter referred as a liquor is fed into a refrigeration unit F from liquor flowline 100 to form a two-phase slurry of about 30% crystallized component, with the balance being liquor.

The refrigeration unit F is of the type commercially available and is of sufficient capacity to form two phase slurry of about 30% crystallized component at predetermined flowrates of liquor. The slurry is then directed through slurry flowline 101 into the receiving chamber 20 through a slurry inlet conduit 18.

The crystallized component is then withdrawn and elevated in the direction of arrows 102 out of the liquor by rotation of the helically-shaped auger A. As the crystallized component is withdrawn and elevated out of the liquor, it passes through the crystal reflux tube 36, which is preferably formed from a foraminiferous material, as noted above.

Since the reflux tube 36 is perforated, a portion of the liquor not adhering to the crystallized component may drain off and be collected in the refluxing chamber 26 while a portion of the liquor will solidify on the ascending crystallized component. It will be understood by those skilled in the art that the term refluxing includes both the downwardly flowing liquor solidfying on ascending crystallized component whereby it can be re-elevated and melted away as well as the draining off of any excess liquor into the reflux chamber 26. The liquor refluxed in this manner may then be extracted through liquor outlet conduit 24 and purged of entrapped impurities by purge unit P and then returned to the refrigeration unit F through purged liquor flowline 103 and again, thereafter reprocessed.

As the crystallized component advances upwardly in the column 10 into the washing tube 34, it is met by a countercurrent flow of heated, inert gas, injected into the crystal collection vessel 24 by the gas recycling means K. It should be noted that the heated inert gas can be nitrogen, carbon dioxide, methane, or any other gas inert with respect to the various components of the liquor. The inert gas preferably has been preheated to a temperature sufficient to melt approximately 5% of the advancing crystallized component. As the crystallized component melts, any remaining adherent liquor is efficiently washed away and drains to a lower portion of the washing tube 34. As the liquor drains, it washes away further adherent liquor on other, continuously advancing crystallized component within the purification column 10. The temperature and flow rate of the heated inert gas may be regulated as desired to establish a temperature gradient in the washing tube 34. The heated, inert gas flows between the baffles 38 and paddles 44 in the washing tube section 34 to ensure the melting of liquor adhering to the crystallized component.

As sufficient crystallized component advances into the washing tube 34, the crystallized component begins to form a porous residue of purified crystallized component because of the countercurrent flow of the heated inert gas through the crystallized component mass. This countercurrent flow allows additional liquified multi-component mixture to melt and reflux.

To further ensure that substantially all adherent liquor is removed a mixing means T mounted within the washing tube section 34 for mixing the advancing crystallized component such that the countercurrent flow of heated inert gas will pass over all the porous residue and wash away all adherent liquor. The mixing means T includes the paddles 44 attached to the shaft 42 of auger A and baffles 38 attached the inner surface 35 of washing tube section 34. The combined action of paddles 44 and baffles 38 minimizes channeling, that is the passage of the heated, inert gas through only selected portions of the porous residue and assists in removing adherent liquid. Once the porous crystallized component residue reaches the top of the washing tube 34, it spills over the top end 40 of washing tube 34 in the direction of arrows 41 into the crystal collection vessel V for collection.

When sufficient amounts of purified residue have collected in the crystal collection vessel V, heating means H causes a portion of the purified residue to melt while the stirring means S insures circulation of the melted residue to enhance melting of all the purified residue collected in the collection vessel V. The melted or partially melted purified residue then flows from the crystal collection vessel V by means of an outlet conduit 50 to a suitable collection recepticle W.

Finally, it will be noted that after the heated inert gas passes through the washing tube 34 and enters the reflux tube 36, it will pass through the perforations in reflux tube 36 into the refluxing chamber 26. Thereafter the gas may be discharged through gas outlet 22 to be reheated and recycled by gas recycling means K. Gas recycling means K is of a type commercially available including recompression means G for recompressing the inert gas to a pressure of preferably 20–150 psi and reheating means Y for reheating the inert gas.

Recompressing means G receives inert gas to be recycled from inert gas flow line 22a and inert gas to be added to the system from supply flowline 105. The recompressing means G discharges recompressed inert gas into flow line 22b. Reheating means Y accepts recompressed inert gas from flow line 22b and discharges reheated and recompressed, i.e. recycled, gas into recycled gas flow line 45a.

The crystal washing apparatus C of the present invention may continuously separate and purify a crystallized component from a liquified multicomponent mixture in a manner more efficient than distillation and prior crystallization units of others. Separation and purification by crystallization is thermally more economical than distillation since the heat of vaporization is approximately five times greater than the heat of crystallization and because the partitioning coefficient of solid-liquid transitions is much higher than in liquid vapor transitions alowing fewer phase transitions to effect the same separation. Since the purity of the distillation process is often limited because of azeotroping, the apparatus and method of the present invention for crystallization can effect a higher degree of purity through advantageous use of the eutectic phase equilibrium of many solutions. Additionally, the novel concept of effecting crystal washing and purification of the present invention with a heated, inert gas overcomes the practical limitations imposed by prior crystallization units. Specifically, commercial rates of forming a crystallized component from a liquified multi-component mixture produced only very small crystals having large relative percentages of adherent liquor. So far as known, prior to the present invention no previous crystal washing apparatus has been able to efficiently deal with the large carry over of contaminated liquor, which is effectively accomplished with the apparatus and method of the present invention.

The foregoing disclosure and description of the invention are illustrative and explanatory thereof, and various changes in the size, shape and materials as well as in the details of the illustrated construction may be made without departing from the spirit of the invention.

I claim:

1. A process for separating and purifying a crystallized component from a two-phase slurry of the crystallized component and liquified multi-component mixture, comprising the steps of:
   directing the two-phase slurry of the crystallized component and liquified multi-component mixture into a purification column;
   separating in the purification column the crystallized component out of the two-phase slurry, the crystallized component retaining the liquified multi-component mixture about the crystalline structure thereof;
   injecting a heated, inert gas into the purification column in a direction countercurrent to the direction of said separating of the crystallized component whereby a portion of the crystallized component is melted to wash away multi-component mixture retained about the crystalline structure of the crystallized component to result in a purified residue of crystallized component;
   passing the inert gas countercurrently through the crystallized component; and,
   mixing the inert gas with the crystallized component to form a porous, high purity residue of crystallized component.

2. The process for separating and purifying the crystallized component from the two-phase slurry of the crystallized component and a liquified multi-component mixture of claim 1, further including the step of:
   refluxing the liquified multi-component mixture adhering to the crystallized component to drain off for to enhance purification of the crystallized component.

3. The process for separating and purifying the crystallized component from the two-phase slurry of the crystallized component and the liquified multi-component mixture of claim 2, further including the steps of:
   extracting the refluxed liquified multi-component mixture from said purification column to reform the two-phase slurry; and,
   purging the extracted refluxed liquified multi-component mixture of a portion of entrapped impurities whereby the concentration of impurities in the crystal washing apparatus is controlled.

4. The process for separating and purifying the crystallized component from the two-phase slurry of the crystallized component and a liquified multi-component mixture of claim 1, further including the step of:
   removing the purified crystallized component residue from the purification column.

5. The process for separating and purifying the crystallized component from the two-phase slurry of the crystallized component and the liquified multi-component mixture of claim 4, wherein said removing further includes the steps of:
   collecting the purified residue of the crystallized component in a collection vessel;
   heating the purified residue of the crystallized component in the collection vessel for melting at least a portion of the purified residue;
   stirring the at least partially melted purified residue to insure uniform heating; and,
   flowing the at least partially melted purified residue outwardly from the collection vessel.

6. The process for separating and purifying the crystallized component from the two-phase slurry of the crystallized component and the liquified multi-component mixture of claim 1, further including the step of:
   recycling the inert gas.

7. The process for separating and purifying the crystallized component from the two-phase slurry of the crystallized component and the liquified multi-component mixture of claim 1, wherein said recycling includes the steps of:
   reheating the inert gas; and,
   recompressing the inert gas.

* * * * *